Sept. 8, 1925.

T. M. MUELLER

VALVED COUPLING

Filed Nov. 8, 1921

1,553,184

INVENTOR.
Theodore M. Mueller
BY
Edward N. Pagelsen
ATTORNEY.

Patented Sept. 8, 1925.

1,553,184

UNITED STATES PATENT OFFICE.

THEODORE M. MUELLER, OF DETROIT, MICHIGAN.

VALVED COUPLING.

Application filed November 8, 1921. Serial No. 513,793.

*To all whom it may concern:*

Be it known that I, THEODORE M. MUELLER, a citizen of the United States, and residing at Detroit, in the county of Wayne and State of Michigan, have invented new and Improved Valved Couplings, of which the following is a specification.

This invention relates to oil receiving check valves adapted to be attached to bearings of any desired style or construction and constituting portions of lubricating systems, and its object is to provide a device of this character to which a supply pipe may be connected, which will adjust itself to the pipe, and which will not leak under pressure.

This invention consists of a stationary member or body adapted to be attached to the bearing to be lubricated and a second member or shell rotatable thereon and having a hub to receive a supply pipe, the two members being formed with bearing surfaces which will be pressed together according to the pressure of the lubricant whereby leakage is avoided.

It further consists in a spring between the members whereby sufficient pressure is constantly maintained between the bearing surfaces to prevent leakage under normal conditions.

It also consists in the details of construction illustrated in the accompanying drawing and particularly pointed out in the claims.

Figure 2:
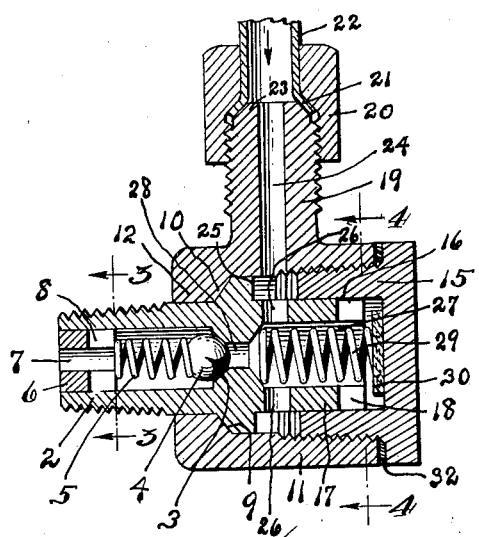
Figure 1:
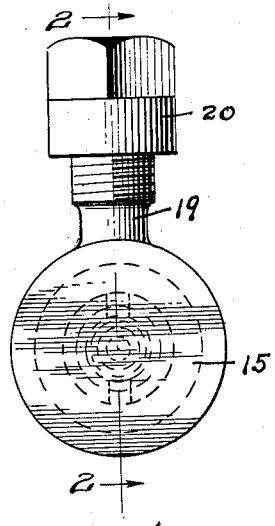
Figure 3:
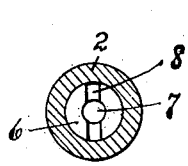
Figure 4:
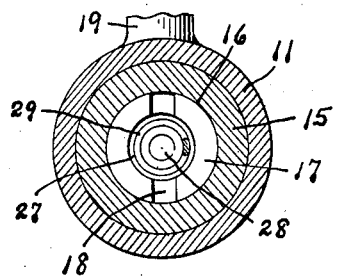

In the drawing, Fig. 1 is an end elevation of this improved oil valve. Fig. 2 is a section on the line 2—2 of Fig. 1. Figs. 3 and 4 are sections on the lines 3—3 and 4—4 of Fig. 2.

Similar reference characters refer to like parts throughout the several views.

In many machines, including motor vehicles, provisions have been made for lubricating the moving parts from a central reservoir and these lubricating systems usually embody pumps which force the oil to the bearings under considerable pressure. The pipes which convey the lubricant must necessarily avoid the paths of moving parts and are preferably attached to rigid frame members so as to be protected as much as possible. As a result, these pipes approach the bearings from all angles so that the oil receivers must be adapted to connect to the supply pipes extending toward such receivers from any direction. As the usual connection between a supply pipe and an oil receiver is a threaded hub on the oil receiver provided with a conical end to fit into the expanded end of the pipe which is secured in position by a coupling nut, it is very desirable that this hub be movable relative to the bearing and that no leakage shall occur between this hub and the bearing. These oil receivers are also preferably so constructed as to prevent the oil already in the bearing from escaping and are therefore usually in the form of check valves.

The check valve shown in the drawing is composed of a central valve body and a shell rotatable thereon, the shell having a hub extending at any desired angle to the axis of the body. The valve body is provided with a threaded end 2 adapted to screw into the part that is to receive the lubricant and is preferably formed with a seat 3 for the ball valve 4 which is held in position by the spring 5 abutting on the plug 6. This plug is forced into position and has a longitudinal passage 7 and a transverse notch 8, the notch permitting passage of the lubricant even if the ball valve is forced against the plug by the incoming lubricant. The valve body is also formed with a conical bearing surface 9 which engages the surface 10 of the shell. The ball may be replaced by any desired device.

The shell has a cylindrical portion 12 which is journaled on the valve body and its opposite end 11 is threaded to receive the plug 15 which is formed with a cylindrical inner surface 16 which engages the surface of the inner end 17 of the body. When the plug is in position, the shell is rotatable on the body and journaled thereon for practically its entire length. This extended bearing is of great value in securing perfect contact of the conical surfaces 9 and 10 and thus preventing leakage. The end of the part 17 of the valve body may be formed with a notch 18 to receive a proper tool whereby the body may be screwed into place on the part to be lubricated.

The shell has a hub 19 extending at any desired angle, the hub being threaded to receive the coupling nut 20 which holds the expanded end 21 of the pipe 22 on the conical end 23 of this hub. The passage 24 in the hub extends to the valve body which is so formed as to have a circumferential passage between the shoulder 25 and the inner end of the plug 15 with which passage the radial passages 26 communicate. The body has a chamber 27 which is an enlargement of the central passage 28, as is also the chamber in which the spring 5 is mounted. A spring 29 presses against a washer 30 and against the bottom of the chamber 27.

The plug 6, spring 5 and ball valve 4 are preferably positioned in the outer chamber in the valve body at the time of making them. When the valve is to be put into use it is slipped into the shell and is then screwed into place by means of a tool which engages in the slot 18. The spring 29 is then slipped into the bore 27 and the plug 15 with the washer 30 therein is screwed into the part 11 of the shell. The shell may then be swung to that position where the pipe 22 requires the least amount of bending to attach thereto.

Under normal conditions the spring 29 has sufficient stiffness to hold the surfaces 9 and 10 against each other with sufficient pressure to prevent leakage. When lubricant is forced in through the pipe 22, pressure within the valve tends to force the shell to the right and the body to the left, in Fig. 2, and merely increases the pressure between these surfaces 9 and 10. The packing ring 32 prevents leakage between the shell and plug.

The details and proportions of the several parts of this check valve may all be changed by those skilled in the art without departing from the spirit of my invention as set forth in the following claims.

I claim:—

1. A valved coupling comprising a body having a circumferential shoulder, a shell rotatable on the body and formed with a hub adapted to connect to a supply pipe, a plug closing one end of the shell and having a cylindrical bore, said body having a cylindrical end fitting in said bore and a recess in said cylindrical end, a spring within the recess pressing against the plug and body to hold the shoulder against a seat within the shell, said body having inlet and outlet passages, and a check valve in said discharge passage.

2. A valved coupling comprising a body and a shell rotatable thereon, said shell being formed with a hub adapted to connect to a supply pipe, a plug closing one end of the shell and having a cylindrical bore, the body having a cylindrical inner end journaled in said plug and a circumferential shoulder intermediate its ends, said shell having a flange extending over said shoulder to prevent the shell being removed from the body, and a spring engaging the plug and body to hold the flange against the shoulder, the body being formed with a central passage and transverse passages at the inner end thereof connecting to the interior of the shell, the outer end of the central passage being enlarged, and a check valve mounted in said enlarged passage.

THEODORE M. MUELLER.